US010478901B2

(12) United States Patent
Deguchi et al.

(10) Patent No.: US 10,478,901 B2
(45) Date of Patent: Nov. 19, 2019

(54) CUTTING INSERT, CUTTING TOOL, AND METHOD OF MANUFACTURING MACHINED PRODUCT

(71) Applicant: KYOCERA CORPORATION, Kyoto-shi, Kyoto (JP)

(72) Inventors: Shin Deguchi, Moriyama (JP); Masahiro Yamamoto, Moriyama (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/771,129

(22) PCT Filed: Oct. 26, 2016

(86) PCT No.: PCT/JP2016/081674
§ 371 (c)(1),
(2) Date: Apr. 26, 2018

(87) PCT Pub. No.: WO2017/073590
PCT Pub. Date: May 4, 2017

(65) Prior Publication Data
US 2018/0257146 A1    Sep. 13, 2018

(30) Foreign Application Priority Data

Oct. 27, 2015    (JP) .................................. 2015-210593

(51) Int. Cl.
*B23B 27/14*    (2006.01)
*B23C 5/20*    (2006.01)

(52) U.S. Cl.
CPC .............. *B23B 27/14* (2013.01); *B23C 5/207* (2013.01); *B23C 2200/085* (2013.01); *B23C 2200/125* (2013.01)

(58) Field of Classification Search
CPC ............ B23B 27/145; B23B 2200/242; B23B 2200/245; B23C 5/207
See application file for complete search history.

(56) References Cited

U.S. PATENT DOCUMENTS

| 6,761,510 B2 * | 7/2004 | Kinukawa | ............. B23B 27/145 407/113 |
| 2002/0054794 A1 * | 5/2002 | Kato | .................... B23B 27/145 407/115 |

(Continued)

FOREIGN PATENT DOCUMENTS

| JP | H09207007 A | 8/1997 |
| JP | 2002192407 A | 7/2002 |

(Continued)

*Primary Examiner* — Alan Snyder
(74) *Attorney, Agent, or Firm* — Viering, Jentschura & Partner MBB

(57) ABSTRACT

A cutting insert of the present disclosure includes a first surface, a second surface, and a cutting edge. The first surface includes a corner part, and a first side and a second side each extending from the corner part. The second surface connects to the first surface. The cutting edge is located at a region where the first surface intersects with the second surface. The cutting edge includes a first cutting edge located at the first side, a second cutting edge located at the second side, and a third cutting edge located at the corner part. The first cutting edge and the third cutting edge are provided with a honing. A honing width of a side of the second cutting edge in the third cutting edge decreases as going away from the first cutting edge and then approaching the second cutting edge.

20 Claims, 20 Drawing Sheets

(56) References Cited

U.S. PATENT DOCUMENTS

2002/0127068 A1  9/2002  Kinukawa et al.
2008/0292415 A1  11/2008  Kuroda et al.

FOREIGN PATENT DOCUMENTS

JP   2004154892 A   6/2004
WO   2007039944 A1  4/2007

* cited by examiner

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2016/081674 filed on Oct. 26, 2016, which claims priority to Japanese Application No. 2015-210593 filed on Oct. 27, 2015, which are entirely incorporated herein by reference.

TECHNICAL FIELD

The present disclosure relates to an indexable cutting insert for use in cutting processes by turning, such as an external turning process, or cutting processes by rolling, such as a milling process. The present disclosure also relates to a cutting tool and a method of manufacturing a machined product.

BACKGROUND ART

A cutting insert (indexable insert) described in Patent Document 1 has been known as a tool used in the milling process. The cutting insert described in Patent Document 1 includes a chamfered part between a major cutting edge and a minor cutting edge. A chamfer that is a kind of honing is provided along the chamfered part. The chamfer on the chamfered part has a straight line shape. The minor cutting edge functions as a so-called wiper cutting edge.

The chamfer in the cutting insert described in Patent Document 1 has the straight line shape and is away from the major cutting edge. Therefore, the chamfered part has high strength, whereas the major cutting edge may have insufficient strength.

RELATED ART DOCUMENTS

Patent Document

Patent Document 1: Japanese Unexamined Patent Publication No. 2004-154892

SUMMARY

A cutting insert in the present disclosure includes a first surface, a second surface, and a cutting edge. The first surface includes a corner part, and a first side and a second side each extending from the corner part. The second surface connects to the first surface. The cutting edge is located at a region where the first surface intersects with the second surface. The cutting edge includes a first cutting edge located at the first side, a second cutting edge located at the second side, and a third cutting edge located at the corner part. The first cutting edge and the third cutting edge are provided with a honing. A honing width of a side of the second cutting edge in the third cutting edge decreases as going away from the first cutting edge and then approaching the second cutting edge.

A cutting tool in the present disclosure includes a holder including a pocket, and a cutting insert in the above disclosure which is attached to the pocket so that at least a part of the cutting edge protrudes from the holder.

A method of manufacturing a machined product in the present disclosure includes rotating a cutting tool in the above disclosure, bringing the cutting tool being rotated into contact with a workpiece, and moving the cutting tool away from the workpiece.

EMBODIMENTS

<Cutting Insert>

Figure 1:
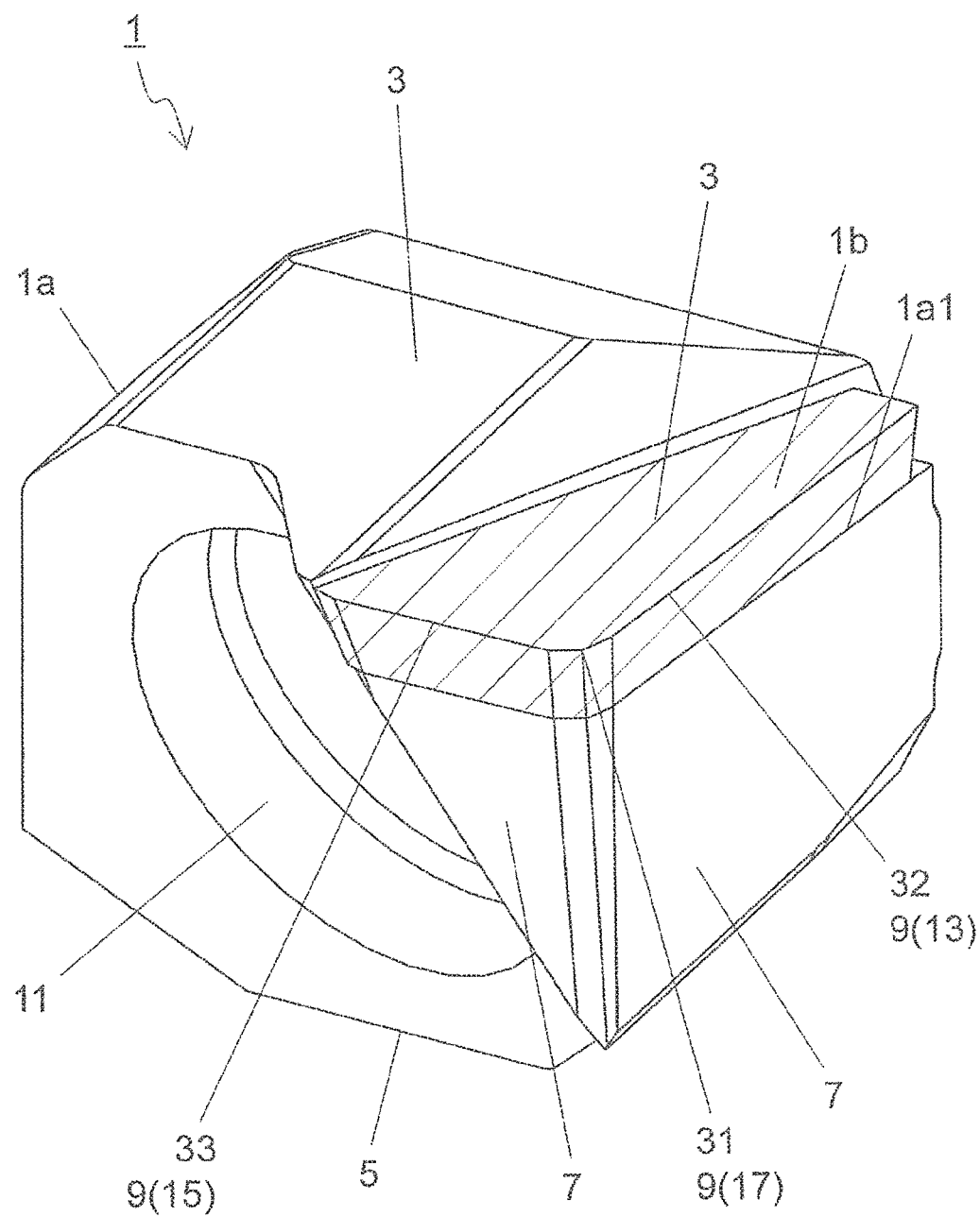
FIG. 1 is a perspective view illustrating a cutting insert in a first embodiment of the present disclosure.

A cutting insert (hereinafter also referred to as "insert") in an embodiment of the present disclosure is described in detail below with reference to the drawings. For the sake of description, the drawings referred to in the following illustrate, in a simplified form, only main members necessary for describing embodiments. The cutting insert of the present disclosure is therefore capable of including any arbitrary structural member not illustrated in the drawings referred to. Sizes of the members in each of the drawings are not ones which faithfully represent sizes of actual structural members and size ratios of these members. These points are also true for a cutting tool and a method of manufacturing a machined product described later. In the following description, a first surface is referred to as an upper surface, a second surface is referred to as a side surface, and a front view of the first surface is referred to as a top view.

First Embodiment

Figure 2:
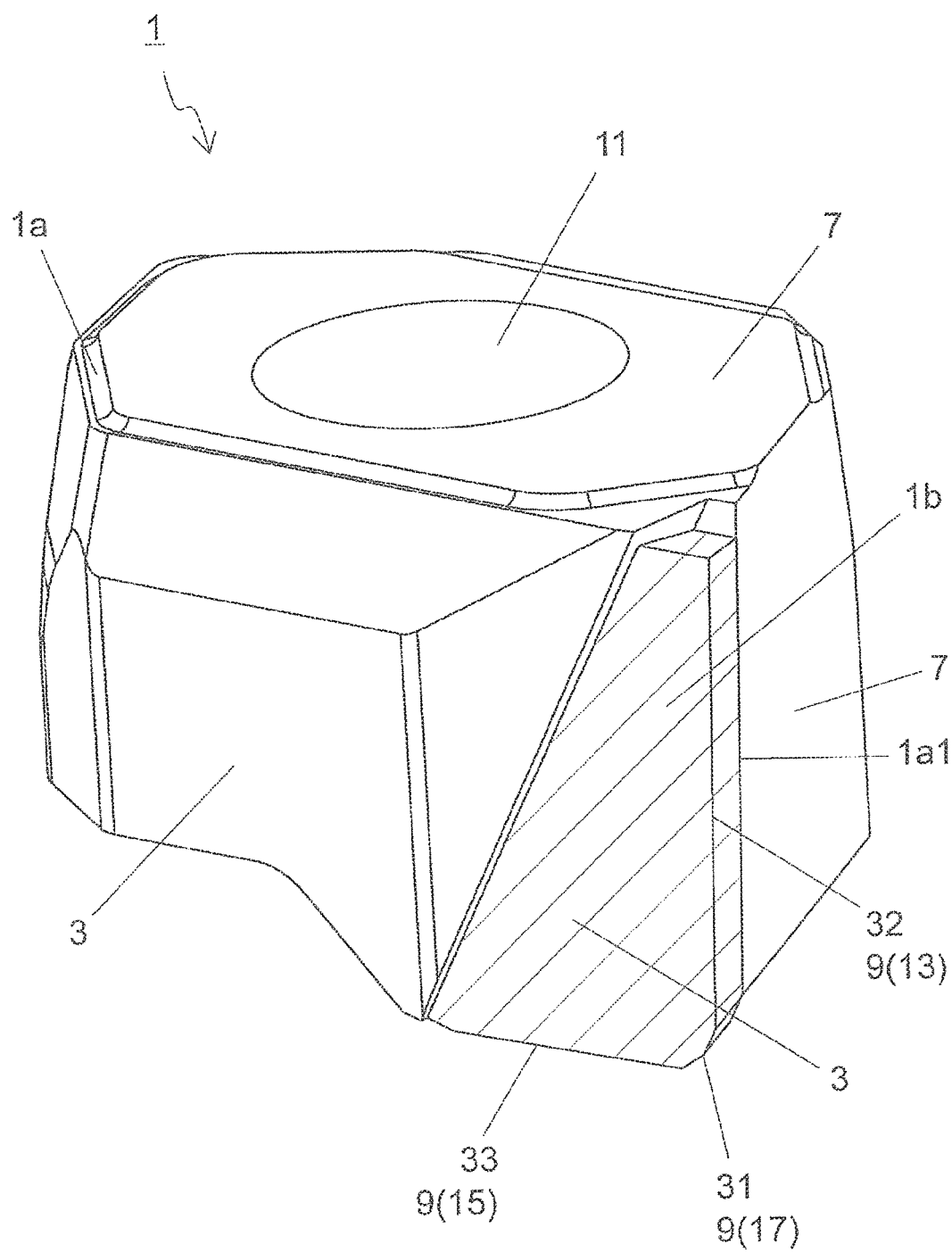
FIG. 2 is a perspective view from another direction in the cutting insert illustrated in FIG. 1.

The insert 1 of the present embodiment includes the upper surface 3, a lower surface 5, the side surface 7, a cutting edge 9, and a through hole 11 as illustrated in FIGS. 1 and 2. The insert 1 is usable in a cutting process by rolling. The insert 1 of the present embodiment is made up of a main body 1a and a cutting part 1b, and has a polygonal column shape as a whole. The main body 1a has an approximately polygonal column shape and includes a concave shaped portion 1a1. The cutting part 1b is joined to the concave shaped portion 1a1 by using a braze material or the like. To facilitate visual understanding, hatching made up of oblique lines is applied to the cutting part 1b in FIGS. 1 and 2.

FIGS. 1 to 10 illustrate an exemplary embodiment in which the cutting edge 9 is not disposed on the main body 1a but disposed on the cutting part 1b. The configuration of the insert 1 as illustrated in FIGS. 1 to 10 contributes to reducing manufacturing costs of the insert 1 while enhancing strength of the cutting edge 9.

For example, cemented carbide or cermet is usable as a material of the main body 1a. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

The cutting part 1b is made of a high hardness material. Specifically, for example, PCD (polycrystalline diamond) or CBN (cubic boron nitride) is usable as a material of the cutting part 1b. When the material of the cutting part 1b is different from the material of the main body 1a, the cutting part 1b may be made of a material having higher hardness than the main body 1a. The hardness of the main body 1a and the hardness of the cutting part 1b are evaluable by measuring Vickers hardness of their respective portions.

The Vickers hardness needs to be evaluated with a well-known test method including pressing a pyramid-shaped (regular quadrangular pyramid shaped) indenter made of diamond against a material surface, and then measuring indentation left after removing a load. However, when the material of the cutting part 1b is PCD, indentation is formed on the main body 1a, whereas little or no indentation may be formed on the cutting part 1b.

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

The upper surface 3 includes a corner part 31, and a first side 32 and a second side 33 each of which extends from the corner part 31. Specifically, an outer peripheral edge of the upper surface 3 has a polygonal shape in a top view illustrated in FIG. 3. The term "top view" denotes a state in which the insert 1 is viewed toward the upper surface 3. A shape of the upper surface 3 of the present embodiment is an approximately rectangular shape in the top view. The cutting part 1b is located on the upper surface 3 so as to include the corner part 31, which is one of four corners, and two sides (32, 33) extending from the corner part 31. When the single corner part 31 included in the cutting part 1b is used as a reference, one of the two sides extending from the corner part 31 can be referred to as the first side 32, and the other of the two sides extending from the corner part 31 can be referred to as the second side 33.

The lower surface 5 has a polygonal shape and has an approximately rectangular shape as in the case of the upper surface 3 in the present embodiment. The cutting part 1b is located at a side of the upper surface 3, but not located at a side of the lower surface 5 in the present embodiment.

As used herein, the term "polygonal shape" does not strictly denote a polygonal shape. For example, each of a plurality of corner parts on the upper surface 3 in the present embodiment is not made into a strict corner. Each of the corner parts in the present embodiment denotes a region surrounded by the sides, and is microscopically made up of a straight line portion and a curved line portion. Each of the plurality of sides on the upper surface 3 in the present embodiment is not limited to a strict straight line shape. These sides may have a slightly outwardly protruding shape or a slightly recessed shape in a top view.

The shapes of the upper surface 3 and the lower surface 5 are not limited to the above embodiment. The shapes of the upper surface 3 and the lower surface 5 are respectively approximately rectangular shapes in the insert 1 of the present embodiment. Alternatively, the upper surface 3 and the lower surface 5 may have any shape, such as a triangular or hexagonal shape.

The side surface 7 is located between the upper surface 3 and the lower surface 5, and connects to the upper surface 3 and the lower surface 5. The side surface 7 is mainly made up of four surfaces because the upper surface 3 and the lower surface 5 respectively have the approximately rectangular shapes in the present embodiment. When each of these main four surfaces is composed of a flat surface, the insert 1 is stably fixable to a holder when attaching the insert 1 to the holder.

The insert 1 of the present embodiment includes the through hole 11 into which a screw is inserted when the insert 1 is screwed into the holder of the cutting tool. Although FIGS. 1 and 2 illustrate an embodiment in which the through hole 11 is formed so as to penetrate through the side surface 7, the through hole 11 may be formed so as to penetrate through the upper surface 3 and the lower surface 5.

The through hole 11 in the present embodiment is not formed in the cutting part 1b, but is formed in the main body 1a. This configuration makes it possible to maintain high strength of the cutting part 1b.

A size of the insert 1 is not particularly limited. For example, a length of long sides of the upper surface 3 in the insert 1 of the present embodiment is settable to approximately 5-20 mm in a top view. A length of short sides of the upper surface 3 is settable to approximately 3-10 mm. A height from the upper surface 3 to the lower surface 5 is settable to approximately 5-20 mm.

The cutting edge 9 is located at a region where the upper surface 3 intersects with the side surface 7 (hereinafter also referred to as "an intersecting region"). More specifically, the cutting edge 9 is located at a region where the single corner part 31, and the first side 32 and the second side 33, each extending from the corner part 31, on the upper surface 3 intersect with the side surface 7. The cutting edge 9 is disposed at the cutting edge part 1b in the present embodiment. In other words, the cutting edge 9 is located at a region where the single corner part 31, and the first side 32 and the second side 33, each extending from the corner part 31, in the cutting part 1b intersect with the side surface 7. Therefore, the cutting part 1b also bears reference numeral 3 that indicates the upper surface in FIGS. 1 to 3. At least a part of the upper surface 3 functions as a rake surface along which chips generated by the cutting edge 9 flow in the configuration illustrated in FIGS. 1 and 2.

The cutting edge 9 in the present embodiment includes a first cutting edge 13, a second cutting edge 15, and a third cutting edge 17. The first cutting edge 13 is located at the first side 32 of the upper surface 3 and has a straight line shape. The first cutting edge 13 need not be located over a full length of the first side 32. The first cutting edge 13 is a member used as a so-called major cutting edge that functions as a major cutting edge when cutting out a workpiece. Therefore, the insert 1 is designed to be attached to the holder of the cutting tool so that the first cutting edge 13 is located at a front end side in a feed direction of the cutting tool. A length of the first cutting edge 13 is larger than a length of the second cutting edge 15. More specifically, the length of the first cutting edge 13 is larger than the length of each of the second cutting edge 15 and the third cutting edge 17.

Figure 3:
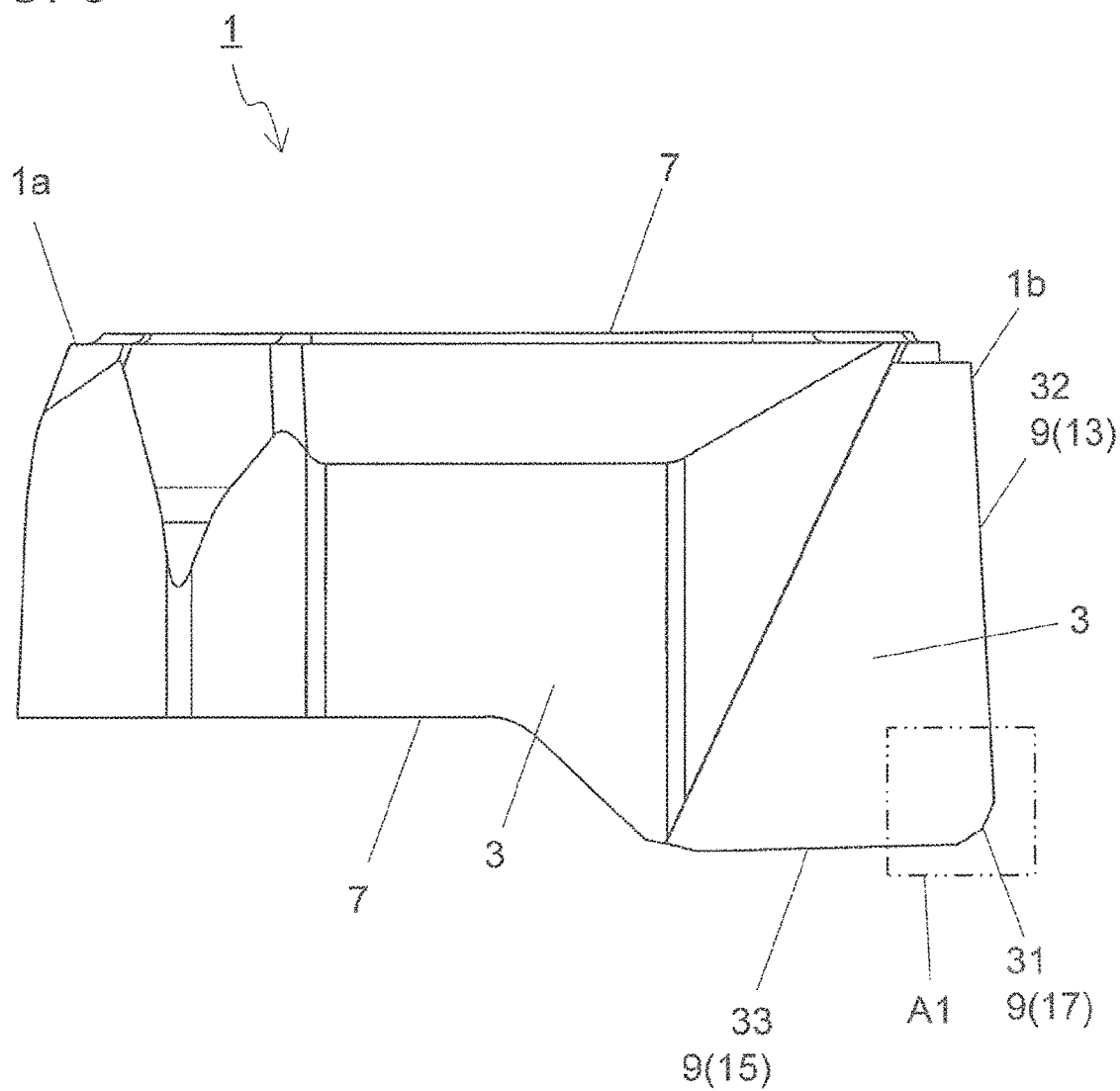
FIG. 3 is a front view of a first surface of the cutting insert illustrated in FIG. 1.

The second cutting edge 15 is located at the second side 33 of the upper surface 3 and has a straight line shape. As illustrated in FIG. 3, the second cutting edge 15 is located so as to be orthogonal to the first cutting edge 13 in a top view. The second cutting edge 15 need not be located over a full length of the second side 33. The second cutting edge 15 is a member used as a so-called wiper cutting edge that functions as a cutting edge for reducing surface roughness of a processing surface when cutting out the workpiece. Therefore, the insert 1 is designed to be attached to the holder of the cutting tool so that the second cutting edge 15 is parallel to the feed direction of the cutting tool. As described earlier, the sides of the upper surface 3 may have the slightly outwardly protruding shape in a top view. Hence, the second cutting edge 15 may have, for example, one or more curved line shapes in a top view. Examples of the curved line shape include a circular arc shape. These points are also true for the first cutting edge 13.

Figure 4:
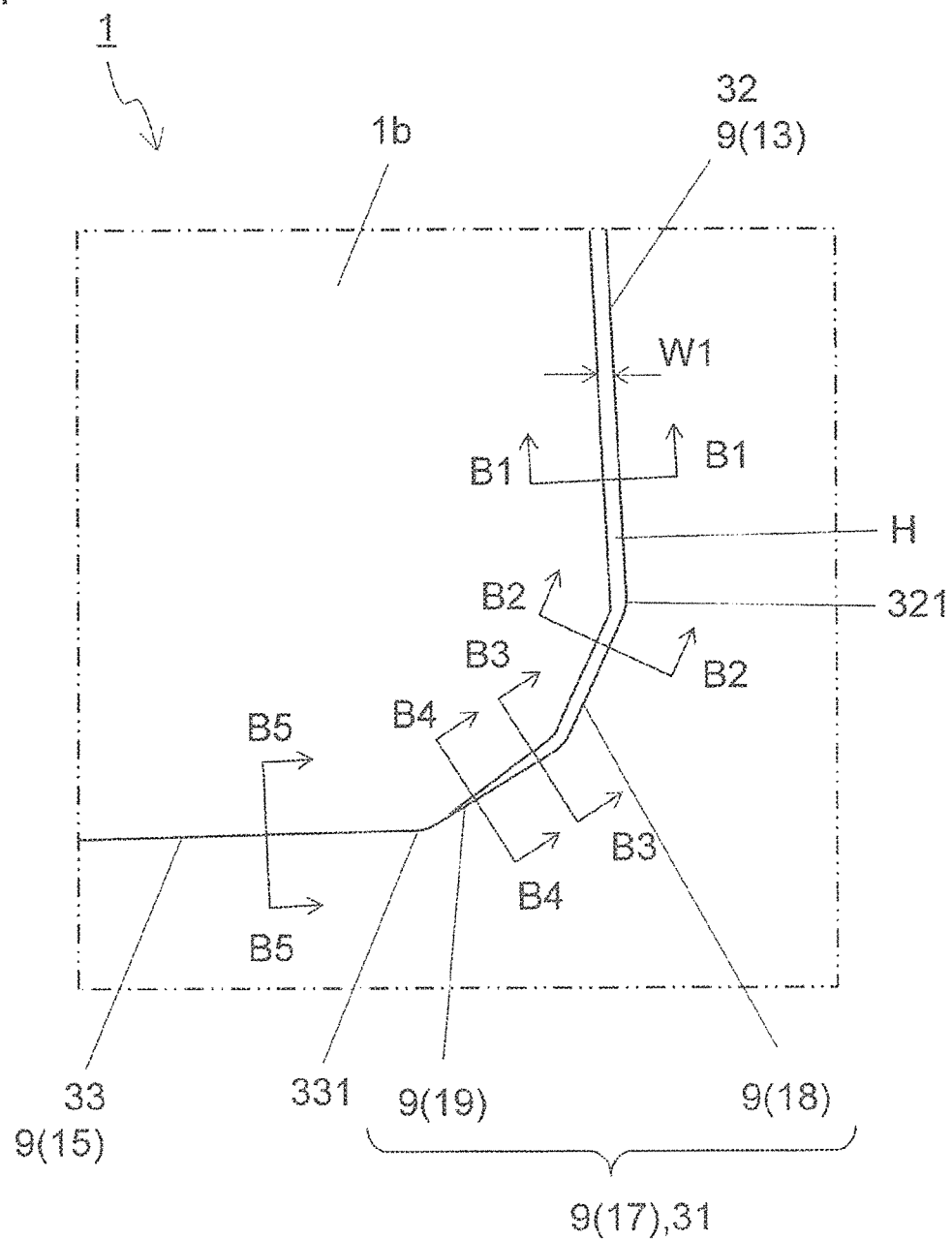
FIG. 4 is an enlarged view of a region A1 in FIG. 3.

The third cutting edge 17 is located at the corner part 31 of the upper surface 3. The corner part 31 in the present embodiment is microscopically made up of the straight line portion and the curved line portion as described above. As illustrated in FIG. 4, the third cutting edge 17 is located at a region surrounded by the first side 32 and the second side 33. The third cutting edge 17 corresponds to a part of the intersecting region which is located from a directional change point 321 on the first side 32 having a straight line shape and extending toward the corner part 31, to a directional change point 331 on the second side 33 having a straight line shape and extending toward the corner part 31.

The first cutting edge 13 and the third cutting edge 17 are already subjected to a so-called honing process. Examples of the honing process include round honing by which the intersecting region is made into a curved surface shape, and chamfer honing by which the intersecting region is made into a cutout shape. The chamfer honing the round honing may be combined together.

Figure 10:
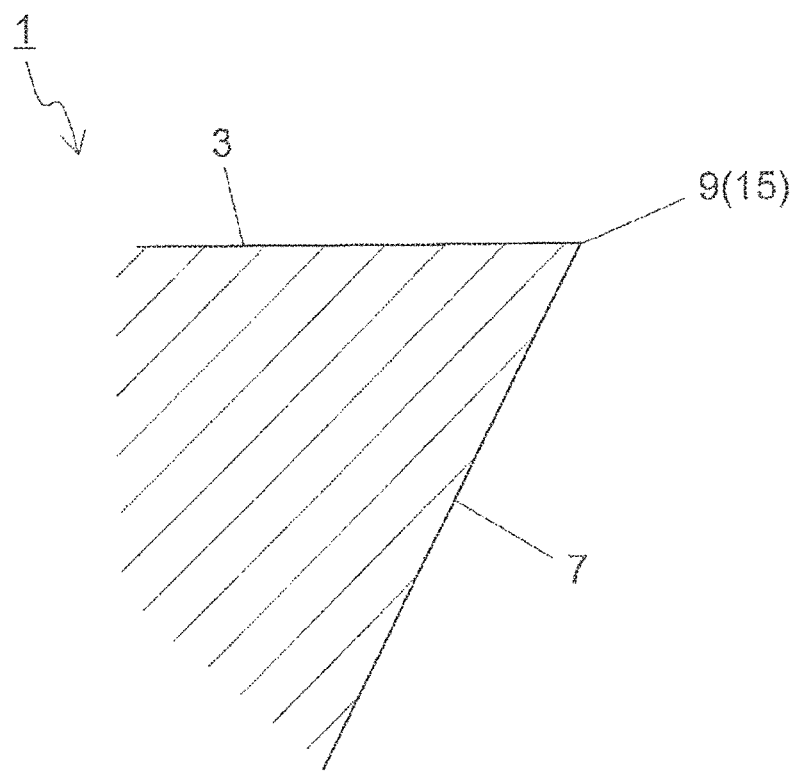
FIG. 10 is a sectional view taken along line B5-B5 in FIG. 4.

As illustrated in FIGS. 4 to 9, the first cutting edge 13 and the third cutting edge 17 are provided with a honing H in the present embodiment. This makes it possible to enhance strength of the first cutting edge 13 that functions as the major cutting edge. As illustrated in FIG. 10, the second cutting edge 15 is a sharp edge not provided with the honing H in the present embodiment. The second cutting edge 15 is therefore suitably usable as the wiper cutting edge. When the second cutting edge 15 is the sharp edge, it is possible to further reduce the surface roughness of the processing surface of the workpiece. Alternatively, the second cutting edge 15 may be provided with the honing H.

Figure 5:
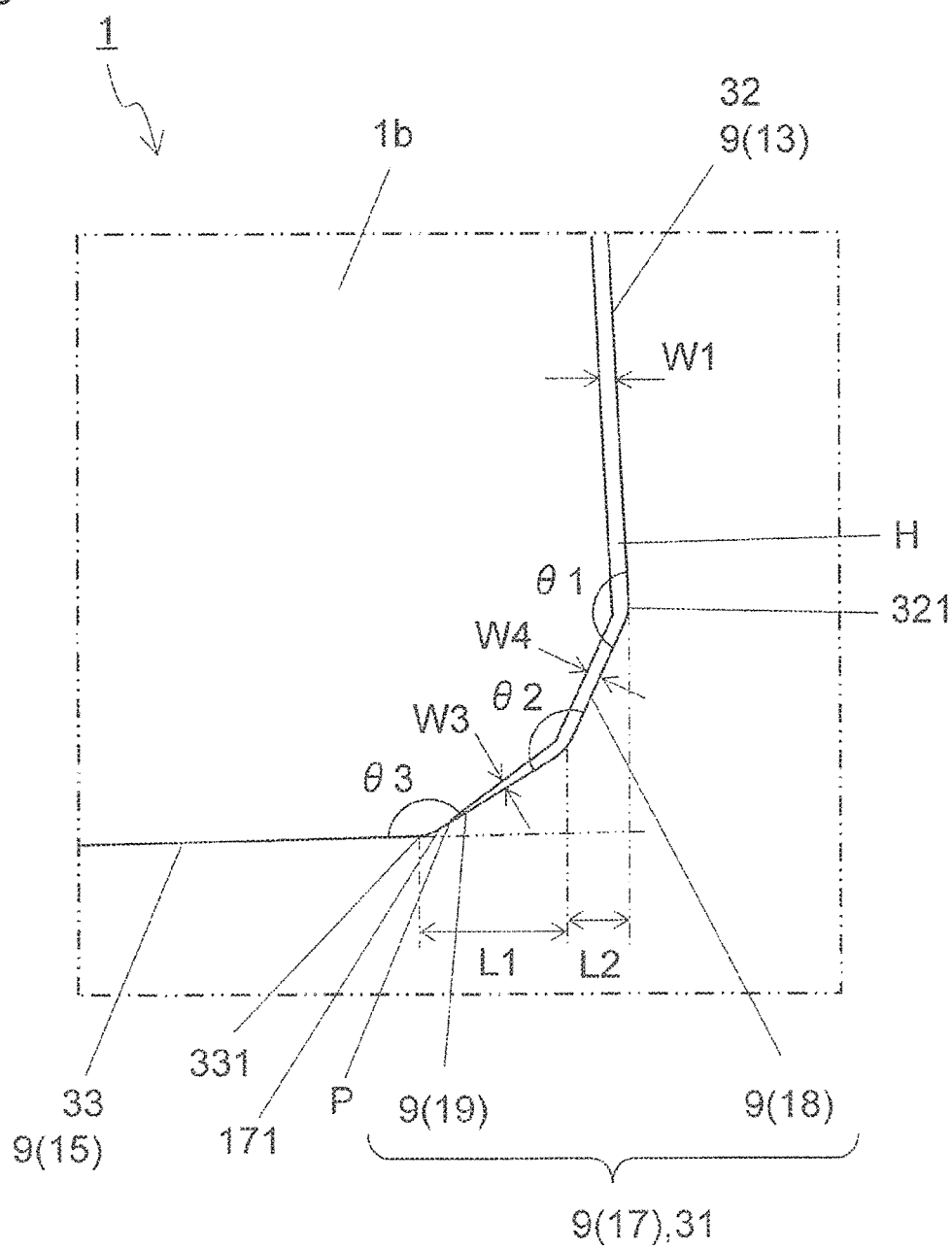
FIG. 5 is an enlarged view of the region A1 in FIG. 3.
Figure 6:
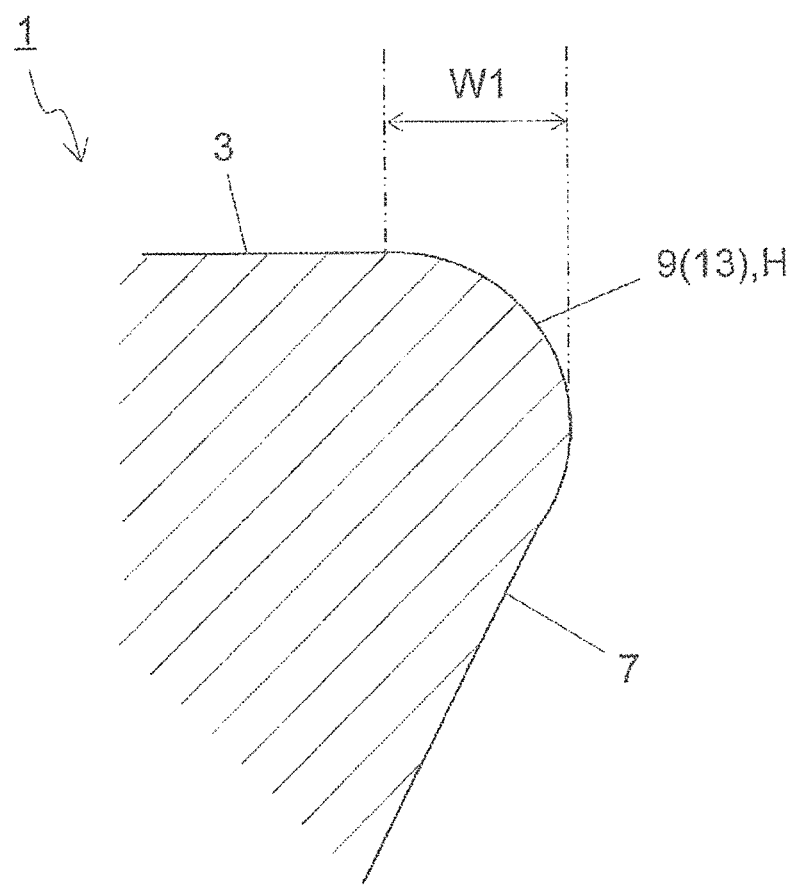
FIG. 6 is a sectional view taken along line B1-B1 in FIG. 4.
Figure 7:
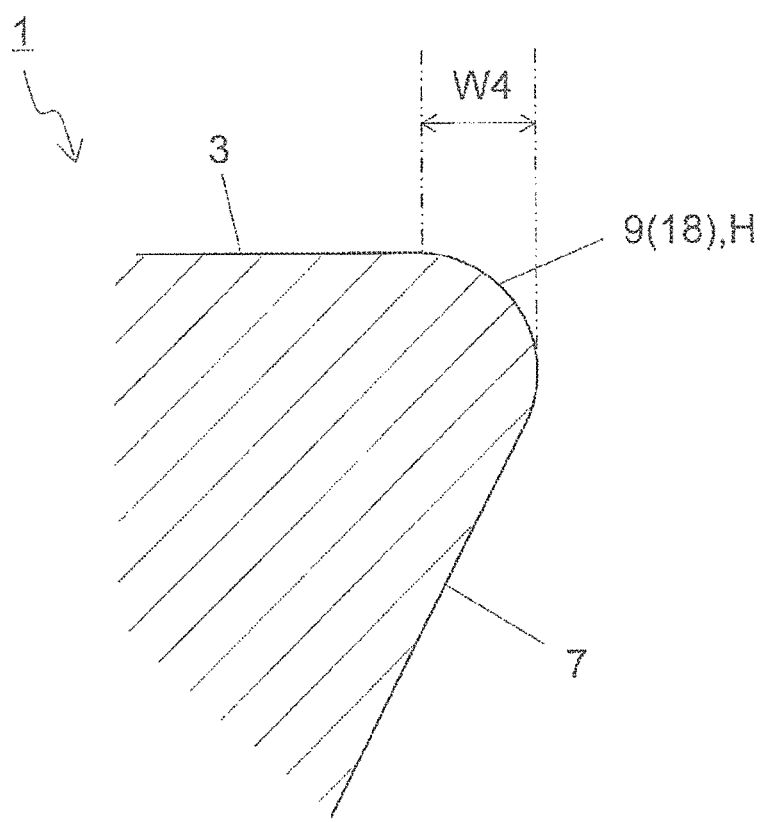
FIG. 7 is a sectional view taken along line B2-B2 in FIG. 4.
Figure 8:
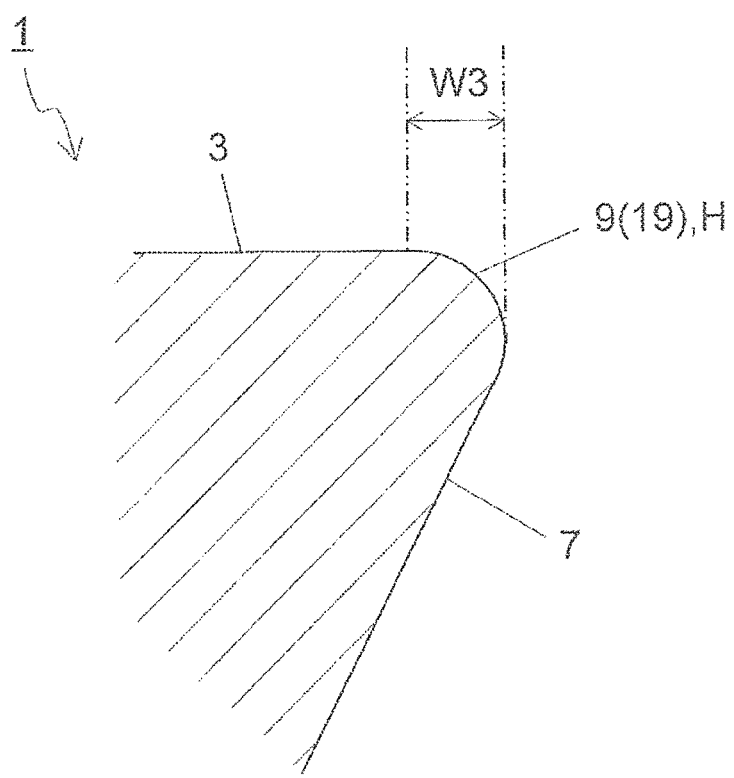
FIG. 8 is a sectional view taken along line B3-B3 in FIG. 4.
Figure 9:
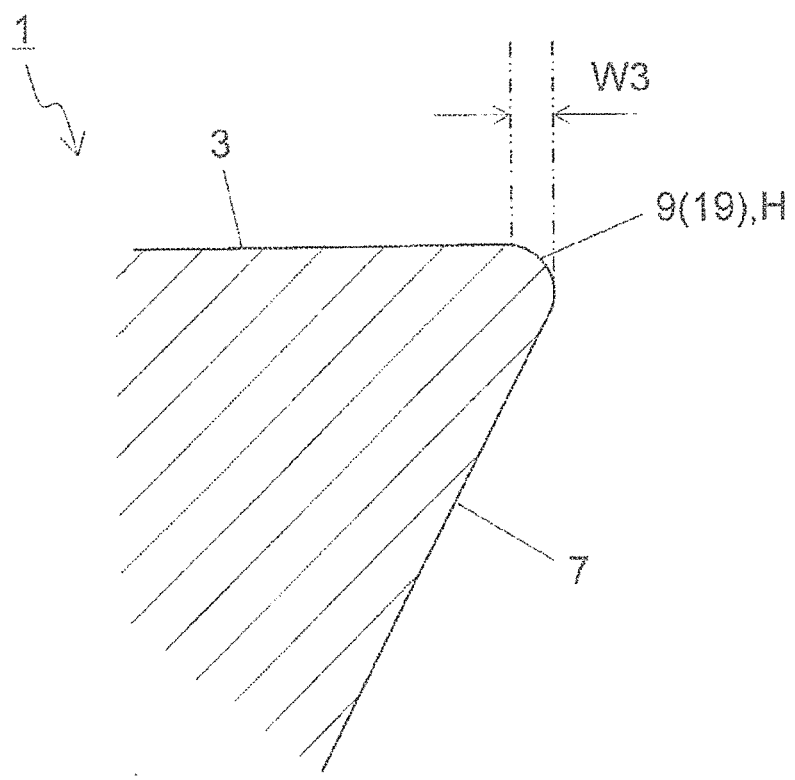
FIG. 9 is a sectional view taken along line B4-B4 in FIG. 4.

A honing width W3 of a side of the second cutting edge 15 in the third cutting edge 17 decreases as going away from the first cutting edge 13 and then approaching the second cutting edge 15 in a top view illustrated in FIG. 5. The phrase that "a honing width W3 of a side of the second cutting edge 15 in the third cutting edge 17 decreases as going away from the first cutting edge 13 and then approaching the second cutting edge 15" denotes that the honing width W3 does not become larger as going away from the first cutting edge 13 and then approaching the second cutting edge 15. Therefore, the honing width W3 of the side of the second cutting edge 15 in the third cutting edge 17 may be partially constant. In other words, a region of the third cutting edge 17 which is located at a side of the second cutting edge 15 may include a region where the honing width is constant.

As used herein, the phrase that "a side of the second cutting edge 15 in the third cutting edge 17" denotes a region near a part of the third cutting edge 17 which connects to the second cutting edge 15 when the third cutting edge 17 connects to the second cutting edge 15. This region may include the part of the third cutting edge 17 which connects to the second cutting edge 15. The above phrase also denotes a region near one of both end portions of the third cutting edge 17 which is a side close to the second cutting edge 15 when the third cutting edge 17 does not connect to the second cutting edge 15. This region may include the end portion of the third cutting edge 17 which is a side close to the second cutting edge 15. Hence, a ratio of the region of the third cutting edge 17 which is located at a side of the second cutting edge 15, to the whole of the third cutting edge 17 is not particularly limited. For example, the region of the third cutting edge 17 which is located at the side of the second cutting edge 15 may correspond to the whole of the third cutting edge 17. In this case, a honing width of the whole of the third cutting edge 17 decreases as going away from the first cutting edge 13 and then approaching the second cutting edge 15.

Thus, the first cutting edge 13 and the third cutting edge 17 are provided with the honing H, and the honing width W3 of the side of the second cutting edge 15 in the third cutting edge 17 is changed as described above in the present embodiment. This ensures a large honing width in a region of the cutting edge 9 which is located from the first cutting edge 13 to the third cutting edge 17. Further, because the honing width W3 in the third cutting edge 17 is changed as described above, it is easier to make the second cutting edge 15 into the sharp edge while maintaining cutting edge strength in the third cutting edge 17. Additionally, even when the second cutting edge 15 is provided with the honing H, it is possible to reduce the honing width in a range from the third cutting edge 17 to the second cutting edge 15. This makes it possible for the second cutting edge 15 to function well as the wiper cutting edge. The foregoing effects are combined to produce the insert 1 whose cutting edge 9 has high strength.

As illustrated in FIGS. 4 and 5, the honing width W3 of the side of the second cutting edge 15 in the third cutting edge 17 decreases at a constant rate as going away from the first cutting edge 13 and then approaching the second cutting edge 15 in the present embodiment. In other words, an inner edge of the honing H of the side of the second cutting edge 15 in the third cutting edge 17 has a straight line shape in a top view. This configuration leads to a smooth connection to the side of the second cutting edge 15 for which more sharpness is required, while maintaining the strength of the third cutting edge 17. It is consequently possible to improve both cutting strength and machined surface accuracy.

As illustrated in FIG. 5, the honing width W3 of the side of the second cutting edge 15 in the third cutting edge 17 may reach zero at a position away from the directional change point 331 on the second side 33. A region 171 extending from a point P, at which the honing width W3 reaches zero, to the directional change point 331 on the second side 33 may be made into a sharp edge. Specifically, the third cutting edge 17 may include the region 171 being the sharp edge in between the second side 33 and the point P at which the honing width W3 of the side of the second cutting edge 15 in the third cutting edge 17 reaches zero. This configuration contributes to ensuring the region serving as the sharp edge near the change point 331, thus leading to higher machined surface accuracy.

A part of the third cutting edge 17 which is located at the side of the second cutting edge 15 may have a straight line shape in a top view. With this configuration, a length of the cutting edge 9 used during the cutting process is reducible, and cutting resistance is less likely to increase.

A honing width W1 in the first cutting edge 13 may be constant in a top view. The first cutting edge 13 is used as the major cutting edge as described earlier. The first cutting edge 13 is therefore subjected to a relatively great cutting load. When the honing width W1 in the first cutting edge 13 is constant, the strength of the first cutting edge 13 can be enhanced, thus leading to enhanced durability of the insert 1.

As illustrated in FIGS. 4 and 5, the third cutting edge 17 may include a fourth cutting edge 18 located at a side of the first cutting edge 13, and a fifth cutting edge 19 located at a side of the second cutting edge 15. The fourth cutting edge 18 is located between the first cutting edge 13 and the fifth cutting edge 19, and has a straight line shape. The fifth cutting edge 19 is located between the fourth cutting edge 18 and the second cutting edge 17, and has a straight line shape. The fourth cutting edge 18 and the fifth cutting edge 19 are provided with a honing H. A honing width W4 in the fourth cutting edge 18 may be constant in a top view.

The fourth cutting edge 18 in the third cutting edge 17 which is close to the first cutting edge 13 is subject to a greater cutting load than the fifth cutting edge 19. When the honing width W4 in the fourth cutting edge 18 is constant, strength can be enhanced over a full length of the fourth cutting edge 18, thus leading to enhanced durability of the insert 1.

The honing width in the first cutting edge 13 may be identical to the honing width in the fourth cutting edge 18 in a top view. Alternatively, the honing width W4 in the fourth cutting edge 18 may be smaller than the honing width W1 in the first cutting edge 13 in the top view. The first cutting edge 13 is subject to a greater cutting load than the fourth cutting edge 18. When the honing width W4 in the fourth cutting edge 18 is smaller than the honing width W1 in the first cutting edge 13, the honing width W4 in the fourth cutting edge 18 is less likely to become larger than necessary. It is therefore possible to enhance the durability of the insert 1 while ensuring that cutting performance of the fourth cutting edge 18 is less likely to deteriorate excessively.

In the insert 1 of the present embodiment, an angle θ1 formed by the first cutting edge 13 and the fourth cutting edge 18 is an obtuse angle in a top view illustrated in FIG. 5. With this configuration, an excessively great cutting load is less likely to be concentrated at a boundary part between the first cutting edge 13 and the fourth cutting edge 18. This leads to enhanced durability of the insert 1.

For the same reason as above, an angle θ2 formed by the fourth cutting edge 18 and the fifth cutting edge 19, and an angle θ3 formed by the fifth cutting edge 19 and the second cutting edge 15 are also respectively obtuse angles. When the angle θ3 formed by the fifth cutting edge 19 and the second cutting edge 15 is the obtuse angle, a cutting load is less likely to be concentrated at the boundary part between these cutting edges 9. This leads to the enhanced durability of the insert 1.

The angle θ1 is, for example, 135-180°. The angle θ2 is, for example, 100-180°. The angle θ3 is, for example, 135-180°.

A length L1 of the fifth cutting edge 19 in a direction along the second cutting edge 15 may be larger than a length L2 of the fourth cutting edge 18 in the direction along the second cutting edge 15 in a top view. This configuration makes it possible to reduce a thickness of chips generating during the cutting process, thereby reducing a cutting load exerted near the fifth cutting edge 19 and the change point 331. Consequently, the cutting edge 9 is less likely to fracture.

The kinds of honing process applied to the first cutting edge 13 and the third cutting edge 17 may be identical or different. When different kinds of honing processes are applied to the first cutting edge 13 and the third cutting edge 17, for example, chamfer honing may be applied to the first cutting edge 13, and round honing may be applied to the third cutting edge 17. Alternatively, a combined process of chamfer honing and round honing may be applied to the first cutting edge 13, and round honing may be applied to the third cutting edge 17.

A honing width of the cutting edge 9 is evaluable in a top view. However, when it is difficult to evaluate the honing width of the cutting edge 9 in the top view, the evaluation may be made by taking a sectional view of the insert 1 in a cross section including the cutting edge 9 as illustrated in FIGS. 6 to 9. FIGS. 6 to 9 are respectively cross sections orthogonal to the cutting edge 9. Besides taking the sectional view of the insert 1, the honing width of the cutting edge 9 may be evaluated, for example, in such a manner that a height of the upper surface 3 is measured by scanning the upper surface 3 with the use of lasers. As illustrated in FIGS. 6 to 9, as a honing process applied to the cutting edge 9, the honing process may be applied not only to a side of the upper surface 3 but also to a side of the side surface 7. In this case, a honing width at the side of the upper surface 3 may be larger than a honing width at the side of the side surface 7.

Second Embodiment

Figure 11:
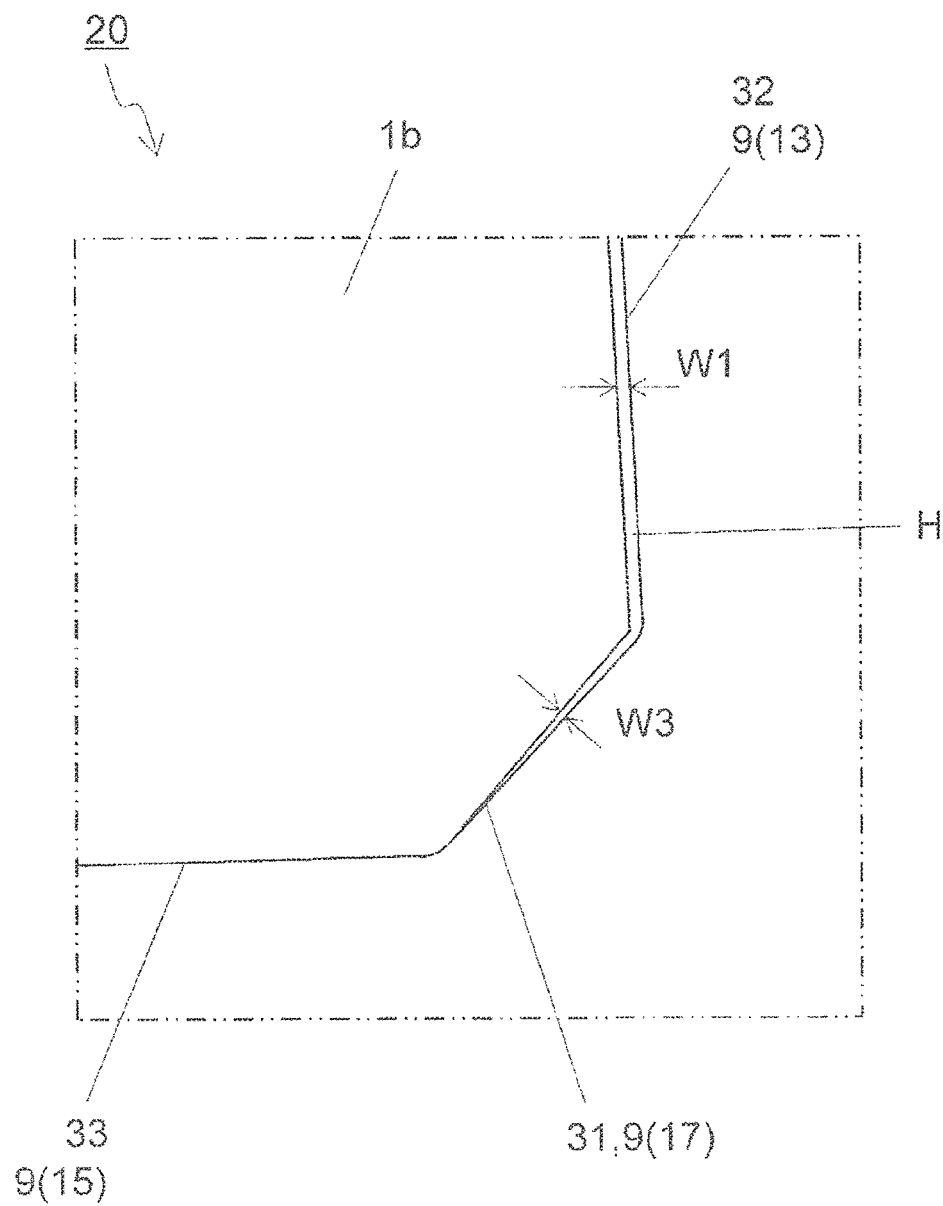
FIG. 11 is an enlarged view of a part of a cutting insert in a second embodiment of the present disclosure, which corresponds to the region A1 in FIG. 3.

An insert 20 in a second embodiment of the present disclosure is described in detail below with reference to FIG. 11. The following description is focused on members different from those in the insert 1 of the first embodiment. Therefore, descriptions of members having configurations similar to those in the first embodiment are omitted by applying the corresponding descriptions in the first embodiment.

Similarly to the insert 1 of the first embodiment, the insert 20 in the second embodiment includes an upper surface 3, a lower surface 5, a side surface 7, a cutting edge 9, and a through hole 11. The third cutting edge 17 constituting the cutting edge 9 in the first embodiment includes the two straight line shaped parts, namely, the fourth cutting edge 18 and the fifth cutting edge 19. In contrast, a third cutting edge 17 in the present embodiment includes only one straight line shaped part. In other words, the third cutting edge 17 in the present embodiment has a straight line shape as a whole as illustrated in FIG. 11. A first cutting edge 13 and the third cutting edge 17 are provided with a honing H. A honing width W3 of a side of the second cutting edge 15 in the third cutting edge 17 decreases as going away from the first cutting edge 13 and then approaching the second cutting edge 15 in a top view. Similarly to the insert 1 of the first embodiment, it is therefore possible to make the second cutting edge 15 function well as a wiper cutting edge, while maintaining strength of the first cutting edge 13.

Third Embodiment

Figure 12:
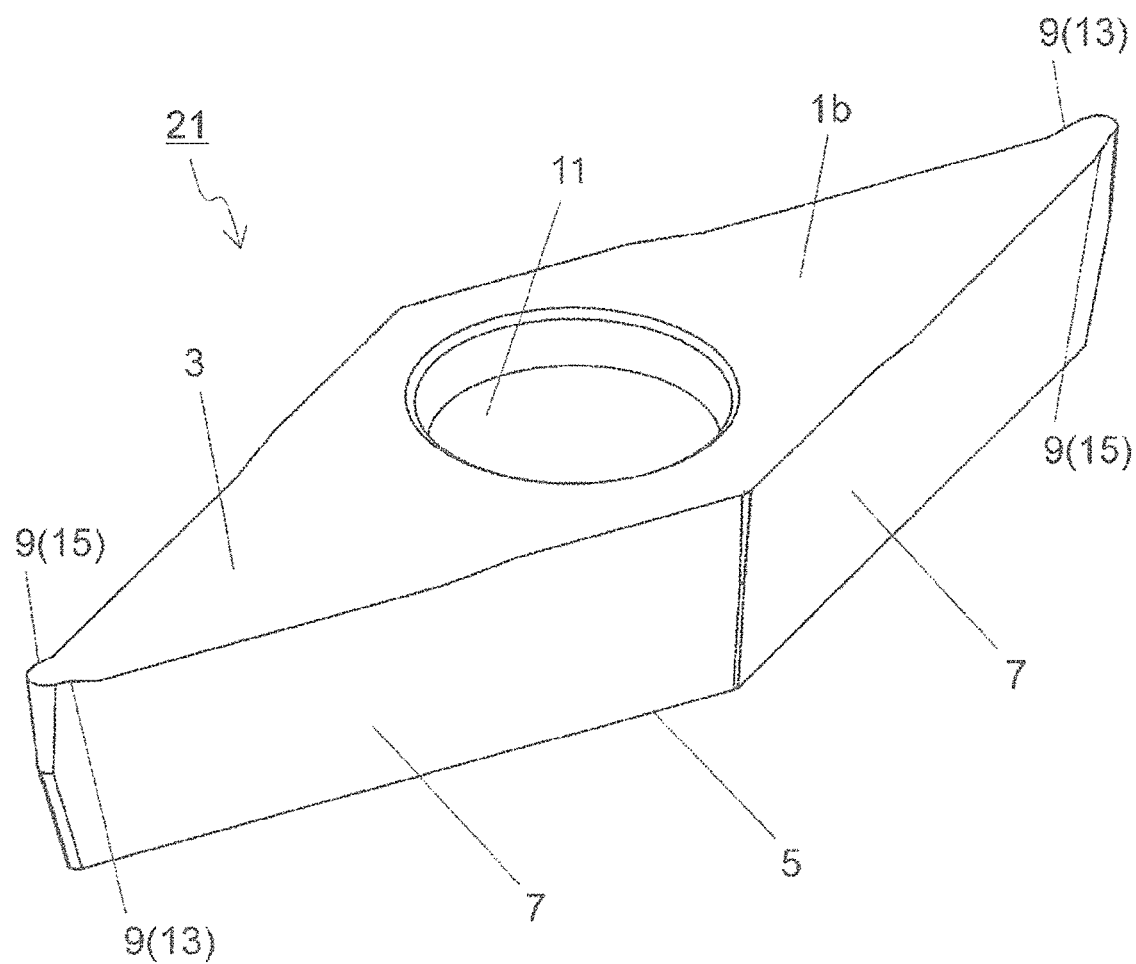
FIG. 12 is a perspective view illustrating a cutting insert in a third embodiment of the present disclosure.
Figure 13:
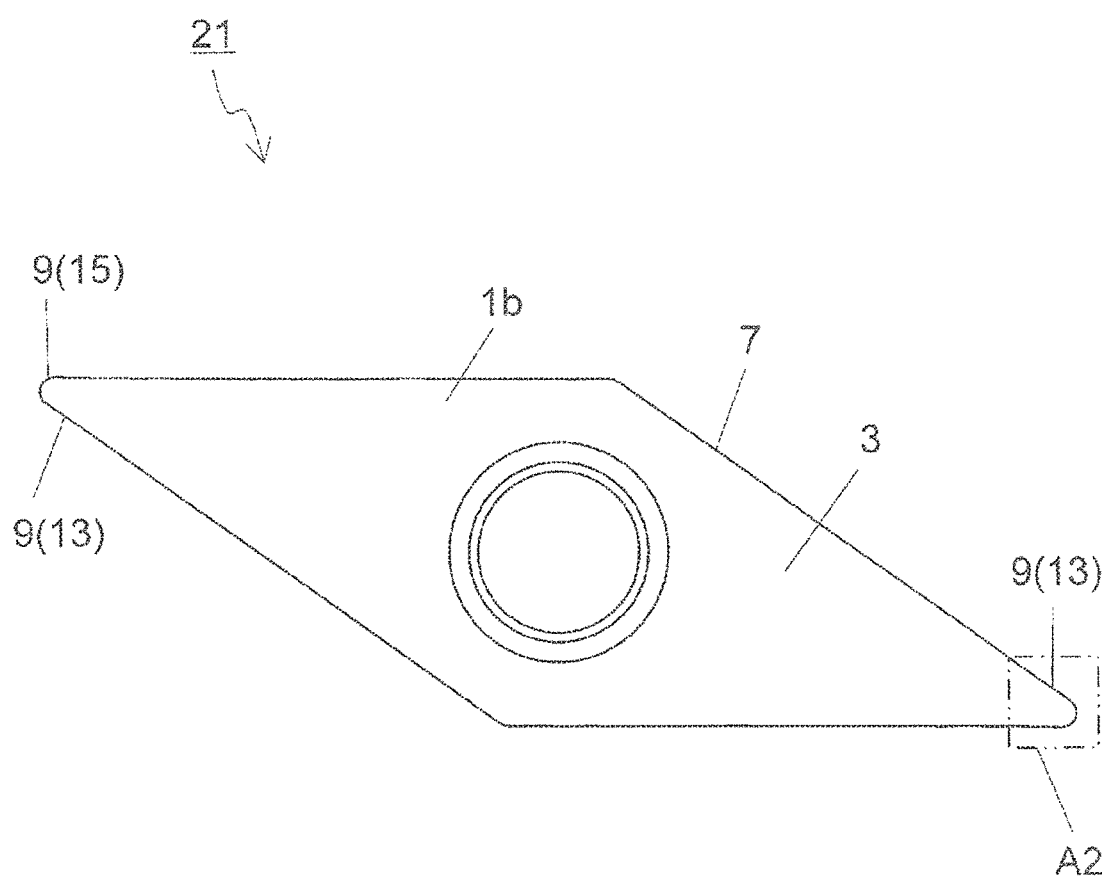
FIG. 13 is a front view of a first surface of the cutting insert illustrated in FIG. 12.

An insert 21 in a third embodiment of the present disclosure is described in detail below with reference to FIGS. 12 to 14. The following description is focused on members different from those in the insert 1 of the first embodiment. Therefore, descriptions of members having configurations similar to those in the first embodiment are omitted by applying the corresponding descriptions in the first embodiment.

Similarly to the insert 1 of the first embodiment, the insert 21 in the third embodiment includes an upper surface 3, a lower surface 5, a side surface 7, a cutting edge 9, and a through hole 11. The insert 1 of the first embodiment is usable in a cutting process by rolling, whereas the insert 21 of the third embodiment is usable in a cutting process by turning. The insert 1 of the first embodiment is not limited to only the cutting process by rolling, but is also usable in the cutting process by turning.

Although the insert 1 of the first embodiment is made up of the main body 1a and the cutting part 1b, the insert 21 of the third embodiment is made only of an approximately polygonal column shaped cutting part 1b. The upper surface 3 in the insert 1 of the first embodiment has the rectangular shape, whereas the upper surface 3 of the insert 21 of the present embodiment has a rhombus shape (refer to FIG. 13).

Figure 14:
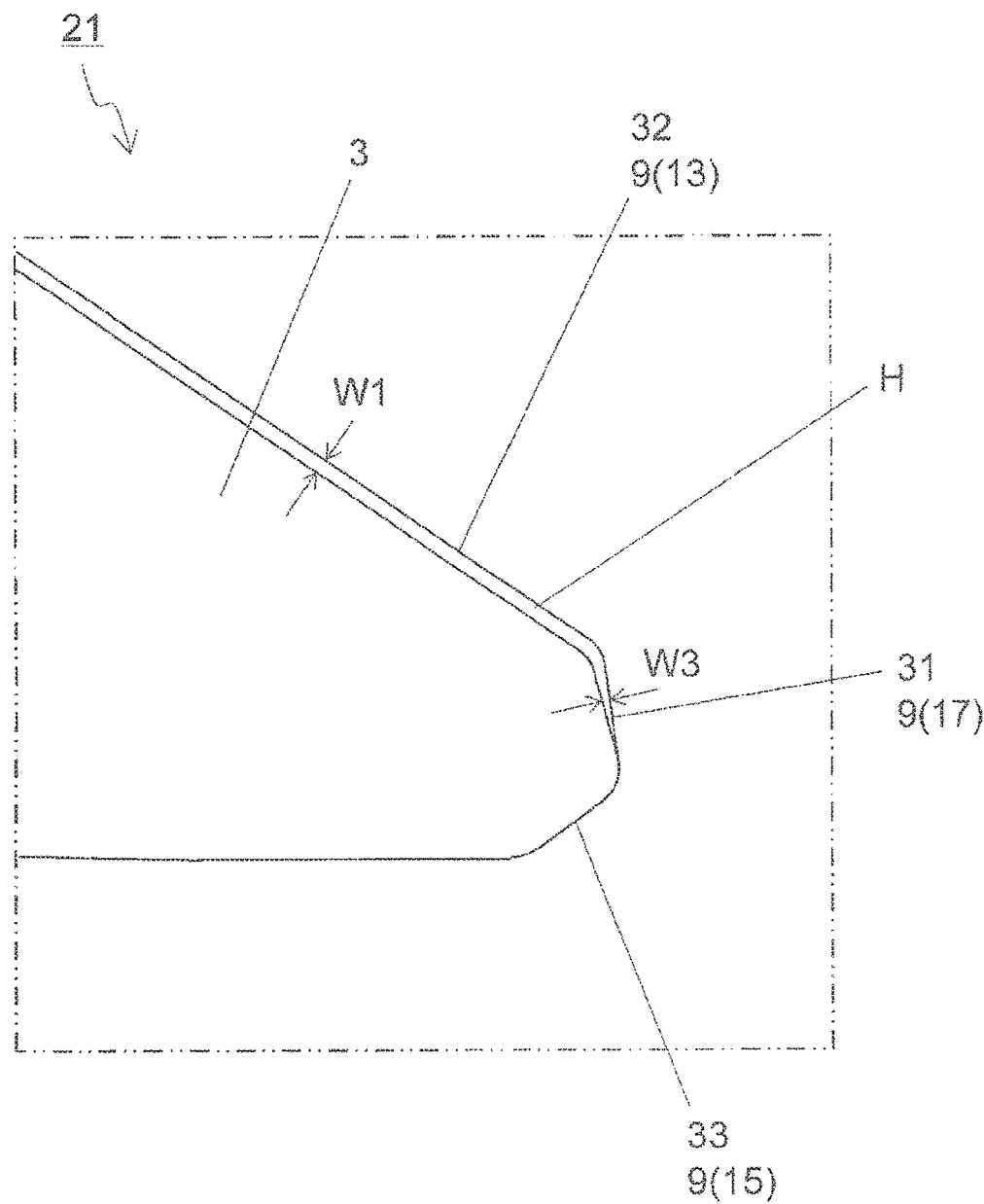
FIG. 14 is an enlarged view of a region A2 in FIG. 13.

As illustrated in FIG. 14, the cutting edge 9 includes a first cutting edge 13, a second cutting edge 15, and a third cutting edge 17 in the insert 21 of the third embodiment. The first cutting edge 13 is located at a first side 32, and the second cutting edge 15 is located at a second side 33. The third cutting edge 17 is located at a corner part 31 and has a straight line shape. The first cutting edge 13 and the third cutting edge 17 are provided with a honing H. A honing width W3 of a side of the second cutting edge 15 in the third cutting edge 17 decreases as going away from the first cutting edge 13 and then approaching the second cutting edge 15 in a top view. Similarly to the insert 1 of the first embodiment, it is therefore possible to make the second cutting edge 15 function well as a wiper cutting edge, while maintaining strength of the first cutting edge 13.

<Cutting Tool>

Figure 15:
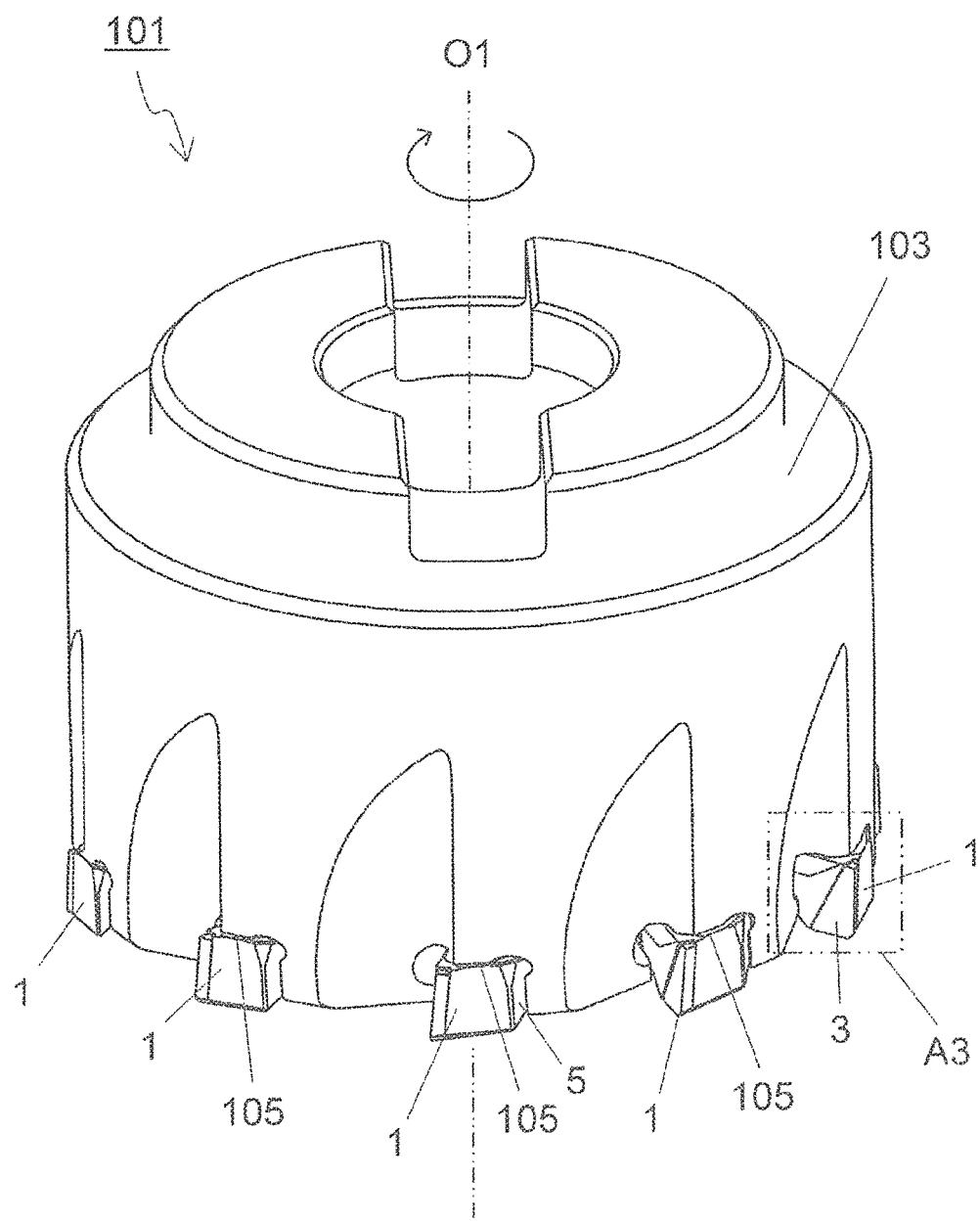
FIG. 15 is a perspective view illustrating a cutting tool in an embodiment of the present disclosure.
Figure 16:
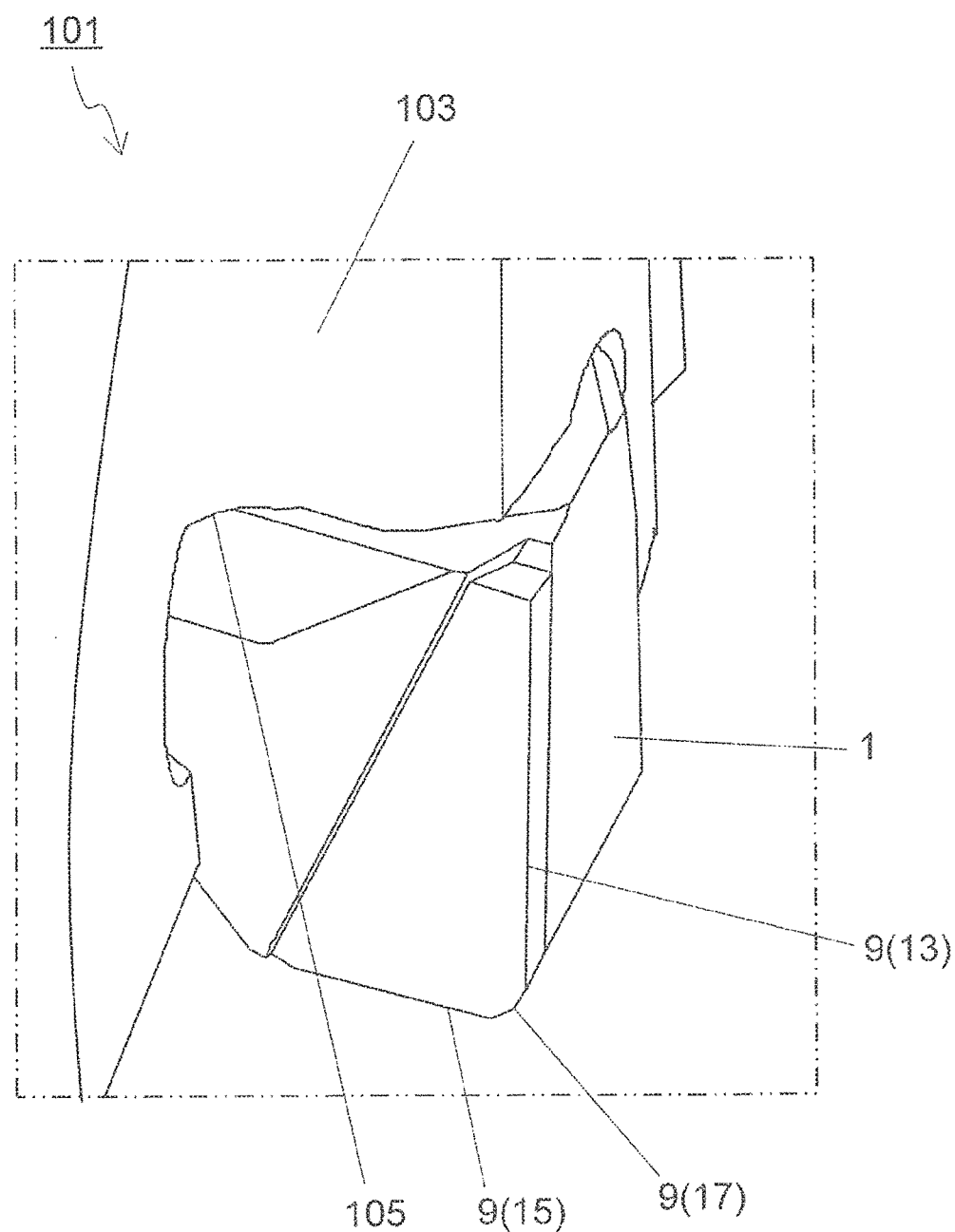
FIG. 16 is an enlarged view of a region A3 in FIG. 15.
Figure 17:
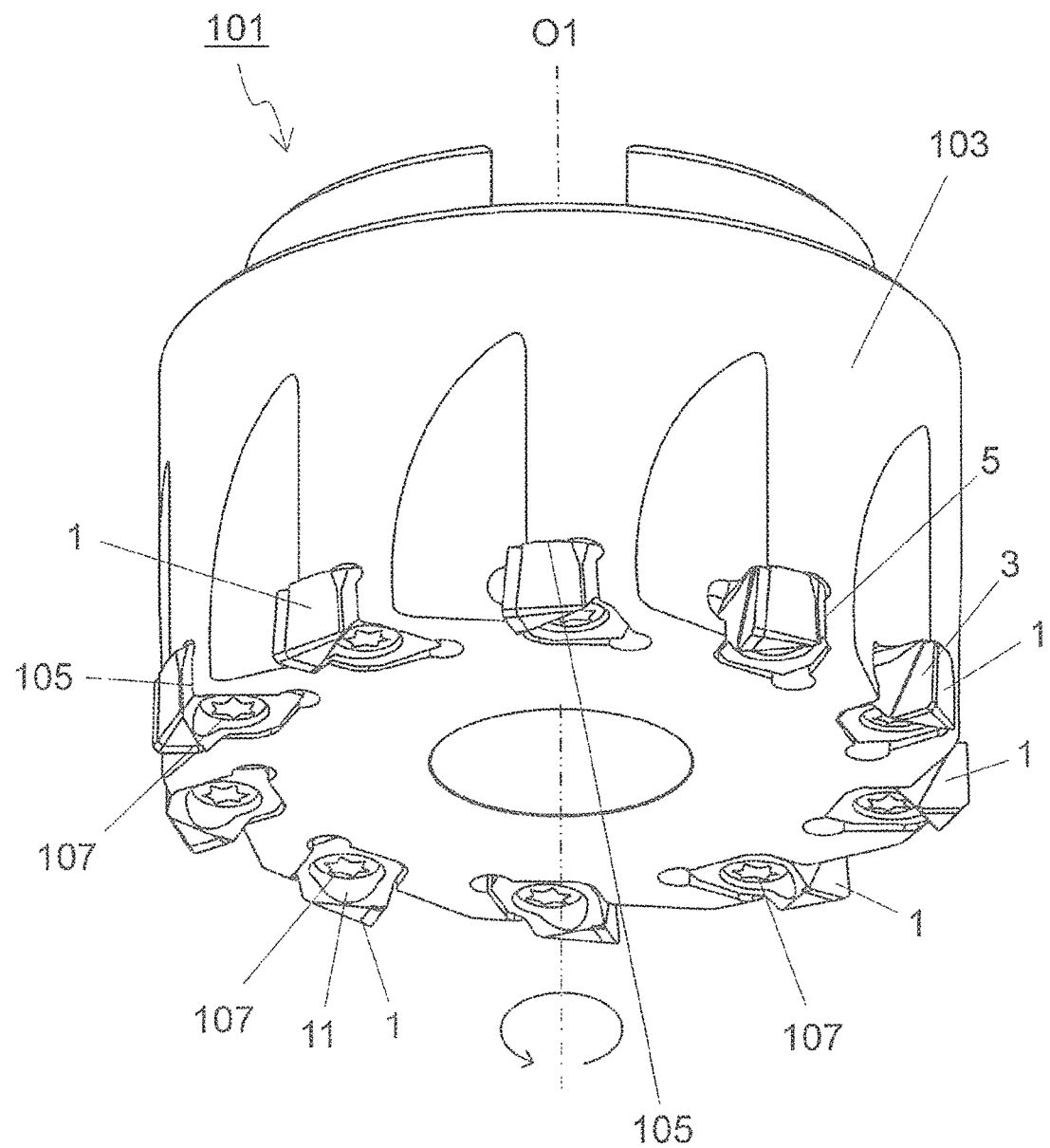
FIG. 17 is a perspective view from another direction of the cutting tool illustrated in FIG. 15.

A cutting tool 101 in one embodiment of the present disclosure is described below with reference to FIGS. 15 to 17. FIGS. 15 to 17 respectively illustrate states in which the insert 1 of the first embodiment is attached to a pocket 105 of the holder 103 by a screw 107. A two-dot chain line in FIGS. 15 and 17 indicates a rotation axis O1 of the cutting tool 101.

The cutting tool 101 of the present embodiment is usable in a cutting process by rolling. The cutting tool 101 includes the holder 103 and a plurality of the inserts 1 as illustrated in FIGS. 15 and 17. The holder 103 has the rotation axis O1 and includes a plurality of pockets 105 on an outer peripheral surface on a front end side of the holder 103. The inserts 1 are respectively attached to the pockets 105.

The holder 103 has an approximately columnar shape around the rotation axis O1. The plurality of pockets 105 are disposed on an outer peripheral surface on a front end side of the holder 103. Each of these pockets 105 is designed to receive the insert 1, and opens into the outer peripheral surface and a front end surface of the holder 103. These pockets 105 are disposed at equal intervals in the present embodiment, but may be disposed at unequal intervals. The holder 103 is not a strict columnar shape because the holder 103 is provided with these pockets 105.

The inserts 1 are respectively attachable to the plurality of pockets 105 of the holder 103. As illustrated in FIG. 16, the plurality of inserts 1 are attached so that at least a part of the cutting edge 9 protrudes outward from the holder 103. Specifically, these inserts 1 in the present embodiment are attached to the holder 103 so that the first cutting edge 13, the second cutting edge 15, and the third cutting edge 17 protrude from the holder 103 toward a workpiece.

In the present embodiment, each of these inserts 1 is attached to the pocket 105 so that the upper surface 3 is directed forward in a rotation direction of the rotation axis O1, and the lower surface 5 is directed backward in the rotation direction of the rotation axis O1 as illustrated in FIGS. 15 and 17. Thus, the upper surface 3 and the lower surface 5 of the insert 1 are not necessarily located in a vertical direction under use environment of the cutting tool 101.

As illustrated in FIG. 16, the first cutting edge 13 is located at a side of a front end in a feed direction of the cutting tool 101, and the second cutting edge 15 is located parallel to the feed direction of the cutting tool 101 as described above in a state in which the insert 1 is attached to the holder 103.

The insert 1 is attached to the pocket 105 by a screw 107 in the present embodiment. Specifically, the screw 107 is inserted into the through hole 11 of the insert 1, and a front end of the screw 107 is inserted into a screw hole (not illustrated) formed in the pocket 105, and the screw 107 is then fixed to the screw hole. The insert 1 is attachable to the holder 103 by fixing the screw 107 in this manner. For example, steels or cast irons are usable as a material of the holder 103. Of these materials, high-rigidity steel may be used.

<Method of Manufacturing Machined Product>

Figure 18:
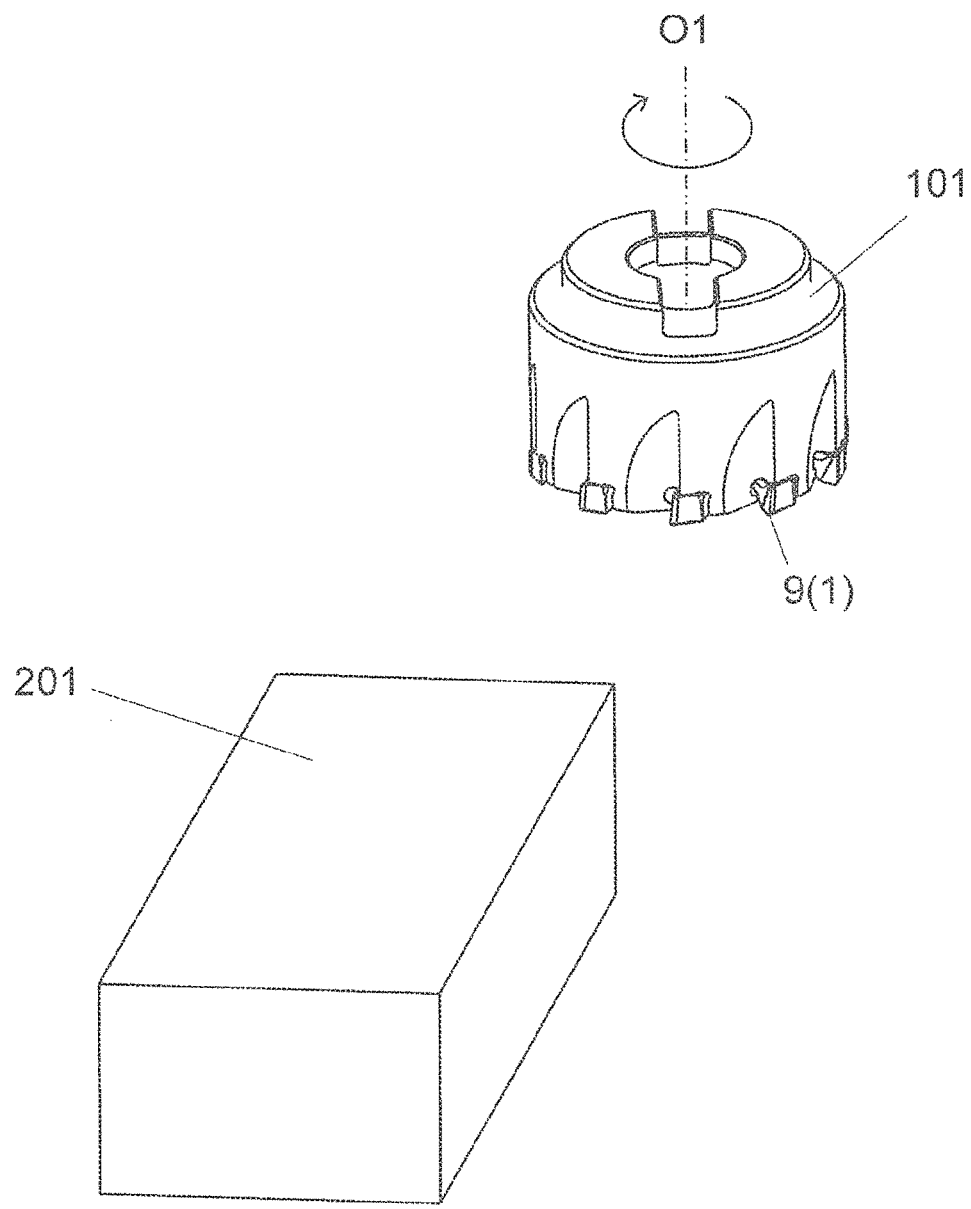
FIG. 18 is a perspective view illustrating a step in a method of manufacturing a machined product in an embodiment of the present disclosure.
Figure 19:
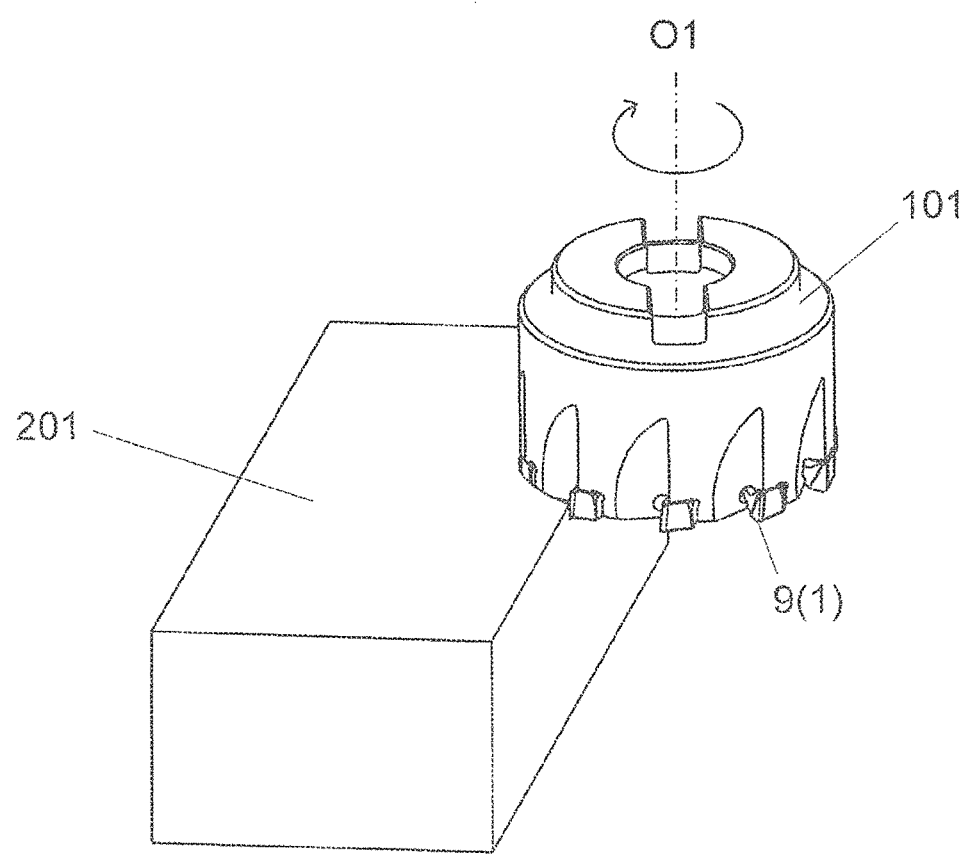
FIG. 19 is a perspective view illustrating a step in the method of manufacturing a machined product in the embodiment of the present disclosure.
Figure 20:
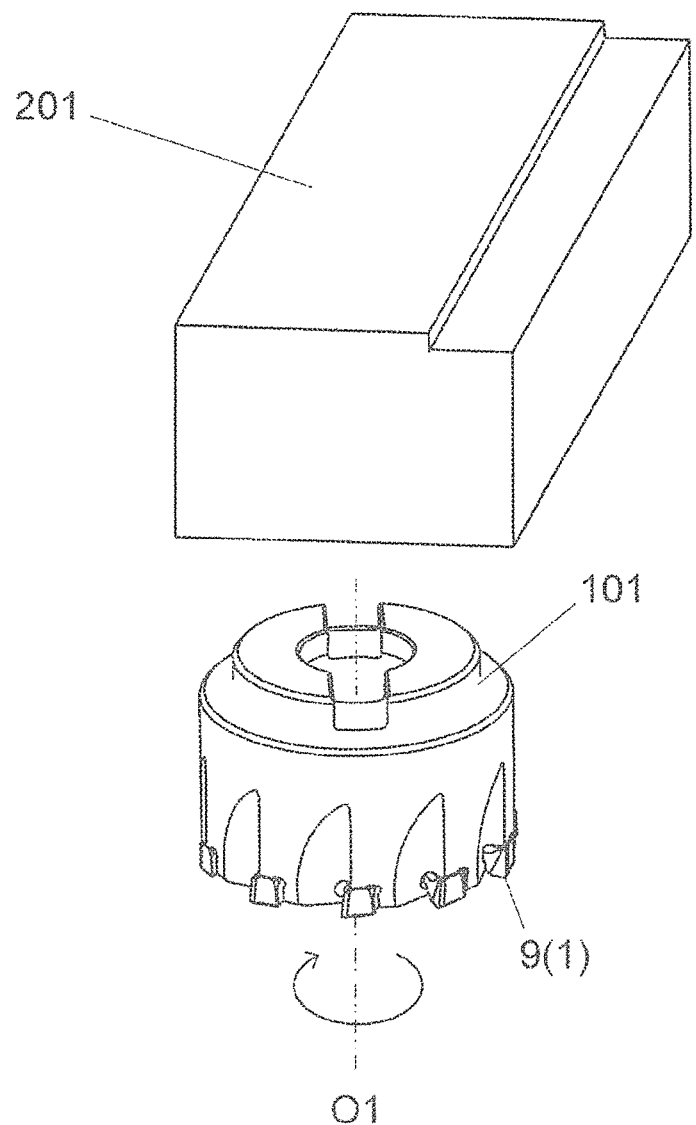
FIG. 20 is a perspective view illustrating a step in the method of manufacturing a machined product in the embodiment of the present disclosure.

A method of manufacturing a machined product in an embodiment of the present disclosure is described below with reference to FIGS. 18 to 20. FIGS. 18 to 20 illustrate the method of manufacturing a machined product when a cutting process is carried out using the above cutting tool 101. A two-dot chain line in FIGS. 18 to 20 indicates the rotation axis O1 of the cutting tool 101.

The machined product is manufacturable by subjecting a workpiece 201 to the cutting process. The method of manufacturing the machined product in the present embodiment includes the following steps:

(1) rotating the cutting tool 101 represented by the foregoing embodiment;

(2) bringing the cutting tool 101 being rotated into contact with the workpiece 201; and (3) moving the cutting tool 101 away from the workpiece 201.

More specifically, firstly, the cutting tool 101 is relatively brought near the workpiece 201 while rotating the cutting tool 101 around the rotation axis O1 as illustrated in FIG. 18. Subsequently, the workpiece 201 is cut out by bringing the first cutting edge 13, the second cutting edge 15, and the third cutting edge 17 as the cutting edge 9 in the cutting tool 101 into contact with the workpiece 201 as illustrated in FIG. 19. Thereafter, the cutting tool 101 is relatively moved away from the workpiece 201 as illustrated in FIG. 20.

With the method of manufacturing a machined product in the present embodiment, the cutting process can be carried out in a stable state over a long term because the method uses the cutting tool 101 provided with the insert 1 including the high-strength cutting edge 9. Additionally, the cutting process with high machined surface accuracy can be carried out because the method uses the cutting tool 101 provided with the insert 1 including the cutting edge 9 that functions well as the wiper cutting edge.

In the present embodiment, the workpiece 201 is fixed, and the cutting tool 101 is brought near the workpiece 201. In FIGS. 18 to 20, the workpiece 201 is fixed, and the cutting tool 101 is rotated around the rotation axis O1. In FIG. 20, the workpiece 201 is fixed, and the cutting tool 101 is moved away from the workpiece 201. Although the workpiece 201 is fixed and the cutting tool 101 is moved at each of the steps in the cutting process in the manufacturing method of the present embodiment, it is, of course, not intended to limit to this embodiment.

For example, in the step (1), the workpiece 201 may be brought near the cutting tool 101. Similarly, in the step (3), the workpiece 201 may be moved away from the cutting tool 101. When the cutting process is continued, it is necessary to repeat the step of bringing the cutting edge 9 of the insert 1 into contact with different portions of the workpiece 201, while keeping the cutting tool 101 rotated.

Examples of the material of the workpiece 201 include carbon steel, alloy steel, stainless steel, cast iron, and nonferrous metals.

While the embodiments in the present disclosure have been described and illustrated above, the present disclosure is not limited thereto. It is, of course, possible to make any arbitrary ones insofar as they do not depart from the gist of the present disclosure.

DESCRIPTION OF REFERENCE NUMERALS 1 cutting insert (insert)
1*a* main body
1*a*1 concave-shaped portion
1*b* cutting part
3 upper surface (first surface)
31 corner part
32 first side
321 directional change point
33 second side
331 directional change point
5 lower surface
7 side surface (second surface)
9 cutting edge
11 through hole
13 first cutting edge
15 second cutting edge
17 third cutting edge
171 sharp edge region
18 fourth cutting edge
19 fifth cutting edge
20 cutting insert
21 cutting insert
101 cutting tool
103 holder
105 pocket
107 screw
201 workpiece
H honing

What is claimed is:

1. A cutting insert, comprising:
   a first surface comprising a corner part and a first side and a second side each extending from the corner part;
   a second surface connected to the first surface; and
   a cutting edge located at a region where the first surface intersects with the second surface, wherein
   the cutting edge comprises:
      a first cutting edge located at the first side,
      a second cutting edge located at the second side, and
      a third cutting edge located at the corner part;
   the third cutting edge comprises:
      a first part connected to the first cutting edge, and
      a second part located between the first part and the second edge;
   the first cutting edge and the third cutting edge are provided with a honing in a front view of the first surface;
   a honing width of the first part is constant; and
   a honing width of the second part decreases as approaching the second cutting edge.

2. The cutting insert according to claim 1, wherein a honing width of the first cutting edge is constant.

3. The cutting insert according to claim 1, wherein the second cutting edge is a sharp edge.

4. The cutting insert according to claim 1, wherein
   the first part has a straight line shape in the front view of the first surface.

5. The cutting insert according to claim 1, wherein the honing width of the first part is smaller than a honing width of the second part in the front view of the first surface.

6. The cutting insert according to claim 1, wherein
   the second part has a straight line shape in the front view of the first surface;
   a first angle is formed by the first cutting edge and the first part, a second angle is formed by the first part and the second part, and a third angle is formed by the second part and the second cutting edge; and
   each of the first angle, the second angle, and the third angle is an obtuse angle in the front view of the first surface.

7. The cutting insert according to claim 1, wherein
   the first part has a first length in a direction along the second cutting edge, and the second part has a second length in the direction along the second cutting edge in the front view of the first surface; and
   the second length is larger than the first length.

8. The cutting insert according to claim 1, wherein a length of the first cutting edge is larger than a length of the second cutting edge.

9. A cutting tool, comprising:
   a holder comprising a pocket; and
   the cutting insert according to claim 1, the cutting insert being attached to the pocket so that at least a part of the cutting edge protrudes from the holder.

10. A method of manufacturing a machined product, comprising:
    rotating the cutting tool according to claim 9;
    bringing the cutting tool being rotated into contact with a workpiece; and moving the cutting tool away from the workpiece.

11. A cutting insert, comprising:
a first surface comprising a corner part and a first side and a second side each extending from the corner part;
a second surface connected to the first surface; and
a cutting edge located at a region where the first surface intersects with the second surface, wherein
the cutting edge comprises:
  a first cutting edge located at the first side,
  a second cutting edge located at the second side, and
  a third cutting edge located at the corner part;
the third cutting edge comprises:
  a first part connected to the first cutting edge, and
  a second part located between the first part and the second edge;
the first cutting edge and the third cutting edge are provided with a honing in a front view of the first surface;
a honing width of the first cutting edge is larger than a honing width of the third cutting edge; and
a honing width of the second part decreases as approaching the second cutting edge.

12. The cutting insert according to claim 11, wherein a honing width of the first cutting edge is constant.

13. The cutting insert according to claim 11, wherein the second cutting edge is a sharp edge.

14. The cutting insert according to claim 11, wherein a honing width of the first part is constant.

15. The cutting insert according to claim 11, wherein the first part has a straight line shape in the front view of the first surface.

16. The cutting insert according to claim 15, wherein
the second part has a straight line shape in the front view of the first surface;
a first angle is formed by the first cutting edge and the first part, a second angle is formed by the first part and the second part, and a third angle is formed by the second part and the second cutting edge; and
each of the first angle, the second angle and the third angle is an obtuse angle in the front view of the first surface.

17. The cutting insert according to claim 11, wherein the honing width of the first part is smaller than a honing width of the second part in the front view of the first surface.

18. The cutting insert according to claim 11, wherein
the first part has a first length in a direction along the second cutting edge, and the second part has a second length in the direction along the second cutting edge in the front view of the first surface; and
the second length is larger than the first length.

19. The cutting insert according to claim 11, wherein a length of the first cutting edge is larger than a length of the second cutting edge.

20. A cutting tool, comprising:
a holder comprising a pocket; and
the cutting insert according to claim 19, the cutting insert being attached to the pocket so that at least a part of the cutting edge protrudes from the holder.

* * * * *